(12) United States Patent
Palmese et al.

(10) Patent No.: US 10,544,265 B2
(45) Date of Patent: Jan. 28, 2020

(54) THERMOSET POLYMERS HAVING A TRIAZINE NETWORK OBTAINED BY REACTION OF CYANATE ESTERS WITH DICYANAMIDE ROOM TEMPERATURE IONIC LIQUIDS

(71) Applicants: Giuseppe R. Palmese, Hainesport, NJ (US); James Throckmorton, Rochester, NY (US)

(72) Inventors: Giuseppe R. Palmese, Hainesport, NJ (US); James Throckmorton, Rochester, NY (US)

(73) Assignee: DREXEL UNIVERSITY, Philadelphia, PA (US)

( * ) Notice: Subject to any disclaimer, the term of this patent is extended or adjusted under 35 U.S.C. 154(b) by 53 days.

(21) Appl. No.: 15/543,550

(22) PCT Filed: Jan. 29, 2016

(86) PCT No.: PCT/US2016/015604
§ 371 (c)(1),
(2) Date: Jul. 13, 2017

(87) PCT Pub. No.: WO2016/123458
PCT Pub. Date: Aug. 4, 2016

(65) Prior Publication Data
US 2018/0044473 A1    Feb. 15, 2018

Related U.S. Application Data

(60) Provisional application No. 62/109,365, filed on Jan. 29, 2015.

(51) Int. Cl.
*C08G 73/06* (2006.01)
*C08G 12/18* (2006.01)

(52) U.S. Cl.
CPC ..... *C08G 73/0661* (2013.01); *C08G 73/0644* (2013.01)

(58) Field of Classification Search
CPC ...................................................... C08G 73/06
(Continued)

(56) References Cited

U.S. PATENT DOCUMENTS 3,876,607 A    4/1975  Snell et al.
4,526,835 A    7/1985  Takahashi et al.
(Continued)

FOREIGN PATENT DOCUMENTS

EP    2527324 A1    11/2012
EP    2634205 A1    9/2013

OTHER PUBLICATIONS

Throckmorton, James, and Giuseppe Palmese. "Acceleration of cyanate ester trimerization by dicyanamide RTILs." Polymer 91 (2016): 7-13.
(Continued)

*Primary Examiner* — Duc Truong
(74) *Attorney, Agent, or Firm* — Mendelsohn Dunleavy, P.C.

(57) ABSTRACT

The invention relates to the use of dicyanamide-containing ionic liquids which decrease the cure temperature of cyanate esters to form unique thermoset polymers having a triazine network. These thermoset polymers having the triazine network have an ionic character allowing for use in varied applications. The thermoset polymers described herein are useful in high temperature performance composites, and their high Tg makes them useful as a substitute for epoxies in the microelectronics industry. The thermoset polymers have good fracture toughness, excellent substrate adhesion, low shrinkage, and low moisture uptake.

17 Claims, 14 Drawing Sheets

(58) Field of Classification Search
 USPC .......................................................... 528/423
 See application file for complete search history.

(56) References Cited

U.S. PATENT DOCUMENTS

| | | |
|---|---|---|
| 5,124,414 A | 6/1992 | Sajal et al. |
| 5,136,011 A | 8/1992 | Barclay et al. |
| 5,442,039 A | 8/1995 | Hefner, Jr. et al. |
| 5,504,186 A | 4/1996 | Roth, Jr. et al. |
| 7,462,681 B1 | 12/2008 | Guenthner et al. |
| 2012/0178853 A1 | 7/2012 | Ogawa et al. |

OTHER PUBLICATIONS

Kimura, H. K. Ohtsuka, and A. Matsumoto. "Curing reaction of bisphenol-A based benzoxazine with cyanate ester resin and the properties of the cured thermosetting resin." Express polym lett 5.12 (2011): 1113-1122.
Chen, Ching-Chung, et al. "A kinetic study on the autocatalytic cure reaction of a cyanate ester resin." Journal of applied polymer science 92.5 (2004): 3067-3079.
Watters, Arianna L., and Giuseppe R. Palmese. "Ultralow percolation threshold of single walled carbon nanotube-epoxy composites synthesized via an ionic liquid dispersant/initiator" Materials Research Express 1.3 (2014): 035013.
International Search Report and Written Opinion; dated Apr. 29, 2016 for PCT Application No. PCT/US2016/015604.
Throckmorton, James A. Ionic liquid-modified thermosets and their nanocomposites: Dispersion, exfoliation, degradation, and cure. Drexel University, 2015.

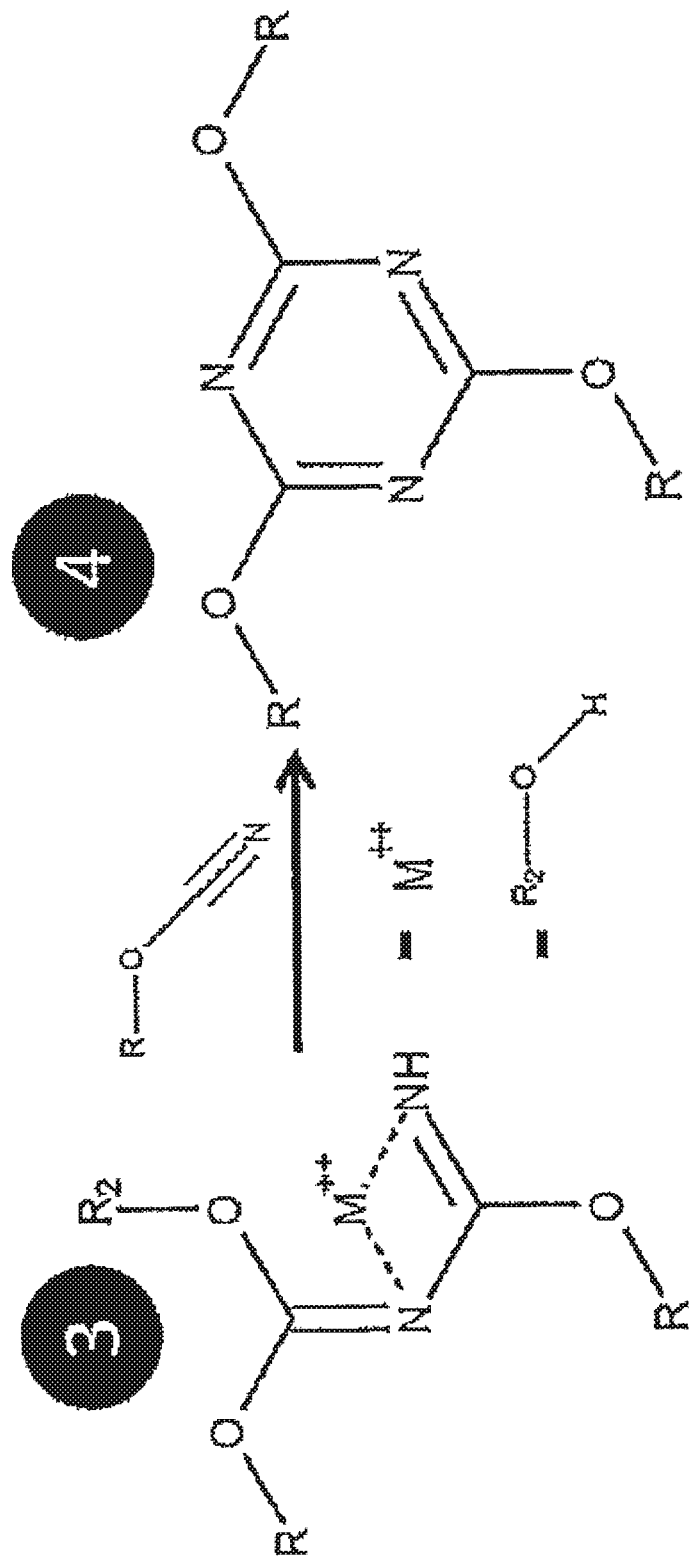
FIG. 1 (continued) (PRIOR ART)

THERMOSET POLYMERS HAVING A TRIAZINE NETWORK OBTAINED BY REACTION OF CYANATE ESTERS WITH DICYANAMIDE ROOM TEMPERATURE IONIC LIQUIDS

STATEMENT OF GOVERNMENT INTEREST

This invention was made with government support under Grant W911NF-06-2-0013 awarded by the Army Research Laboratory (ARL). The Government has certain rights in this invention.

BACKGROUND OF THE INVENTION

Field of the Invention

The invention relates to the use of dicyanamide-containing ionic liquids which accelerates the cure and decreases the cure temperature of cyanate esters to form unique thermoset polymers having a triazine network.

Brief Description of the State of the Art

The unique ring-forming trimerization cure mechanism and rigid thermoset structure of cyanate ester resins (CEs) give them a range of valuable properties for high performance materials applications. Nair, C. et al., *Cyanate Ester Resins, Recent Developments*. Springer Berlin/Heidelberg. 2001; Vol. 155, pp 1-99.

The trimerization of cyanate ester monomers can occur without additives, although this is thought to proceed due to the presence of trace monomer synthesis catalysts or residual phenols as taught by Chen, C.-C. et al. (A kinetic study on the autocatalytic cure reaction of a cyanate ester resin, *Journal of Applied Polymer Science* 2004, 92 (5), 3067-3079). Typically, active hydroxyl donors such as nonylphenol in concert with metal catalysts such as titanium, cobalt, copper, chromium, iron, tin, zinc, or manganese are used to accelerate cure speed and extent. A simplified scheme of trimerization is shown in FIG. 1 (excluding side reactions), involving a cyclotrimerization reaction of a cyanate ester monomer wherein both catalysis mechanisms, one catalyzed by a hydroxyl source and the other by a metal catalyst are given. Initially, the hydroxyl source combines with a cyanate ester monomer having structure (1) to form an imidocarbonate having structure (2). The metal-stabilized imidocarbonate can interact with a second monomer to form a stabilized dimer having structure (3). A third monomer completes the triazine ring of structure (4), and the hydroxyl source and metal catalyst are recycled for further reaction.

These catalysis systems have several downsides. Nonylphenol acts as an endocrine mimic, with metabolic and reproductive consequences in many aquatic species, with feminization of males, sterility, and juvenile death occurring with concentrations as low as 8.2 µg/L, as discussed in Soares, A. et al. (Nonylphenol in the environment: A critical review on occurrence, fate, toxicity and treatment in wastewaters. *Environment International* 2008, 34 (7), 1033-1049); and Giger, W. et al. (4-Nonylphenol in sewage sludge: accumulation of toxic metabolites from nonionic surfactants. *Science* 1984, 225 (4662), 623-625). Metallic coordination catalysts, particularly copper, have been shown to accelerate hydrolysis within cured cyanate ester resins, leading to significant network degradation, $T_g$ loss, and blistering, see Hong, S.-G. et al. (Catalytic effects of copper oxides on the curing and degradation reactions of cyanate ester resin. *Journal of Applied Polymer Science* 2007, 104 (1), 442-448); Zacharia, R. E. et al. (Effect of catalyst on the thermal degradation of a polycyanurate thermosetting system. *Journal of Applied Polymer Science* 1997, 64 (1), 127-131); and Marella, V. V., et al. (Hydrolytic degradation of highly crosslinked polyaromatic cyanate ester resins. *Polymer Degradation and Stability* 2014, 104 (0), 104-111).

Accordingly, it is an object of certain embodiments of the present invention to provide a curable composition which can be cured to form a thermoset polymer having a triazine network, wherein the thermoset polymer has a range of valuable properties for high performance materials applications.

Another object of certain embodiments of the present invention is to incorporate ionic liquids comprising dicyanamide anions that accelerate the cure of the curable composition to form the thermoset polymer having a triazine network.

Another object of certain embodiments of the present invention is to use a synthesis strategy which modifies the network structure and removes or reduces the need for metal catalysts which contribute to cyanate ester degradation, potentially decreasing the rate of hydrolytic degradation and its associated $T_g$ loss.

SUMMARY OF THE INVENTION

An aspect of the invention is a curable composition for preparing a thermoset polymer having a triazine network, said curable composition comprising: (a) a cyanate ester monomer; and (b) at least one ionic liquid comprising a dicyanamide anion. An advantage of the invention incorporating the curable composition is that the reaction temperature can be lowered when compared to conventional methods.

Another aspect of the invention is a method of preparing the thermoset polymer having a triazine network comprising combining, in any order, the following: (a) a cyanate ester monomer, and (b) at least one ionic liquid comprising a dicyanamide anion to form a mixture, and heating the mixture to a temperature sufficient to cause a curing reaction to thereby form the thermoset polymer having a triazine network.

Another aspect of the invention is a thermoset polymer having a triazine network, wherein:

the polymer comprises a triazine ring (II) bonded to two oxygen atoms and a nitrogen anion, wherein each of the two oxygen atoms are members of a different cyanurate ester functional group connected to the network, and wherein the nitrogen anion is bonded to a triazine ring (III), and wherein the polymer further comprises a triazine ring (IV) bonded to three oxygen atoms, wherein each of the three oxygen atoms are members of a different cyanurate ester functional group connected to the network.

Another aspect of the invention is drawn to a thermoset polymer having a triazine network, wherein the polymer comprises a triazine ring (I) bonded to two oxygen atoms and a nitrogen anion, wherein each of the two oxygen atoms are members of a different cyanurate ester functional group connected to the network, and wherein the nitrogen anion is bonded to a carbon atom of a cyano group.

The thermoset polymer having a triazine network of the present invention can be tailored to have a range of valuable properties for high performance materials applications. Glass transition temperatures ($T_g$) in the range of 180-400° C. promise applications in high temperature performance composites, and a $T_g$ above hot solder temperatures makes the inventive thermoset polymer a promising substitute for epoxies in the microelectronics industry. Other significant properties include good fracture toughness, excellent substrate adhesion, low shrinkage, and low moisture uptake. For these and other applications in the electronics, communications, and aerospace industries, the properties of the inventive thermoset polymer make them attractive replacements for common thermosetting systems such as epoxies or maleimides.

DETAILED DESCRIPTION OF THE PREFERRED EMBODIMENTS

Figure 1:
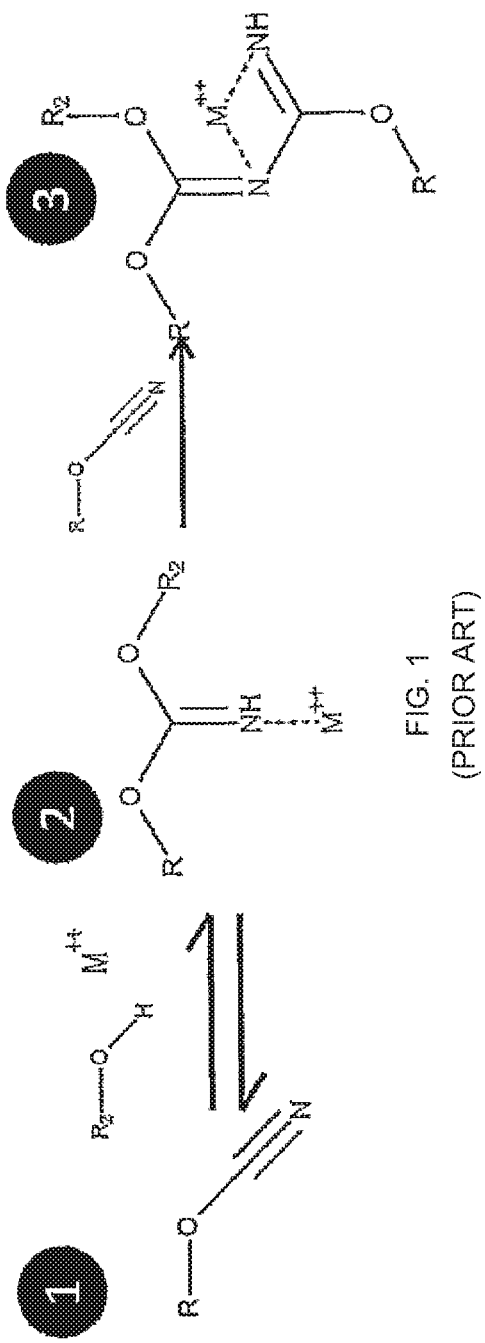
FIG. 1 is a simplified scheme of trimerization of cyanate ester monomer with a hydroxyl source and a metal catalyst (excluding side reactions) of the prior art.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising", "including", and "having" can be used interchangeably.

The term "resin" as used herein means an oligomer or polymer having a two or three-dimensional network structure depending on the extent of the cure.

The term "alkyl" as employed herein refers to straight, branched, cyclic, and/or substituted saturated moieties having a carbon chain of from about 1 to about 100 carbon atoms.

The term "alkenyl" as employed herein refers to straight, branched, cyclic, and/or substituted unsaturated moieties having a carbon chain of from about 3 to about 10 carbon atoms.

The term "aryl" as employed herein refers to single and multi-ring aromatic compounds that may include alkyl, alkenyl, aralkyl, amino, hydroxyl, alkoxy, and/or halo substituents, and/or heteroatoms including, but not limited to, nitrogen, oxygen, and sulfur.

[Curable Composition]

An aspect of the invention is a curable composition for preparing a thermoset polymer having a triazine network, said curable composition comprising:
(a) a cyanate ester monomer, and
(b) at least one ionic liquid comprising a dicyanamide anion.

Preferably, the ratio of cyanate ester monomer to dicyanamide is 2:1 to 400:1, and more preferably, the ratio is 9:1 to 400:1. Most preferably, the ratio is 20:1 to 400:1.

In the curable composition of the present invention, it is preferred to not add metals which can catalyze trimerization of cyanate ester monomer under curing conditions. Metals which can catalyze trimerization of cyanate ester monomer under curing conditions may be present as an impurity in a concentration of less than 10 ppm, preferably less than 1 ppm. These metals include at least one of titanium, cobalt, copper, chromium, iron, tin, zinc, and manganese.

[Ionic Liquids]

Ionic liquids are used in the curable composition that comprises a dicyanamide anion as an initiator for the cyanate ester cure. Ionic liquids are non-volatile, environmentally benign, and non-toxic. The term "ionic liquid" (IL) generally refers to a salt comprising an anion and a cation As used herein, the term, "ionic liquid" refers to a salt comprising an anion and a cation and capable of melting at a temperature falling within a range not higher than the curing temperature of the resin. Preferably, the ionic liquid is a molten salt at an ambient temperature comprising an anion and a cation. Room temperature ionic liquids (RTILs) are ionic liquids which have melting points below room temperature, i.e. (<23° C.). RTILs are characterized by being non-volatile, they typically have negligible vapor pressure, are typically non-flammable and have a high thermal stability. In addition, RTILs may exhibit a wide temperature range for liquid phase of up to about 300° C. RTILs are highly solvating, yet non-coordinating and make good solvents for many organic and inorganic materials. RTILs also have an adjustable pH.

In the curable composition of the invention, it is desirable that the ionic liquid uniformly liquefies at or below the curing temperature, and from the viewpoint of readily preparing the composition, the melting point of the ionic liquid is preferably lower than an ambient temperature such as 23° C.

In an aspect of the invention, the ionic liquid comprises the dicyanamide anion and at least one cation selected from the group consisting of imidazolium, phosphonium, pyridinium and pyrrolidinium. Preferably said cation is selected from the group consisting of 1-ethyl-3-methyl imidazolium, 1-(3-cyanopropyl)-3-methyl imidazolium, trihexyltetradecylphosphonium, 1-(2-hydroxyethyl)-3-methylimidazolium, 1-butyl-3-methyl pyridinium, and 1-butyl-1-methyl-pyrrolidinium.

In addition to the dicyanamide anion, the ionic liquid can include anions such as alkyl sulfate anions such as ethyl sulfate, tosylate anions, tetrafluoroborate ion, bis(trifluoromethylsulfonyl) imide anions, and halide anions such as a fluoride ion, a chloride ion, a bromide ion, and an iodide ion.

Ionic liquids may be prepared in any suitable, conventional manner. For producing the ionic liquid, an anion exchange method that comprises reacting a precursor comprising a cation moiety such as an alkylimidazolium, alkylpyridinium, alkylammonium or alkylsulfonium ion and a halogen-containing anion moiety, with $NaBF_4$, or the like, can be employed. Alternatively, an acid ester method comprising reacting an amine substance with an acid ester to introduce an alkyl group can be employed. Another method involves neutralization of an amine with an organic acid to give a salt. Other suitable, conventional methods may also be employed. In the neutralization method with an anion, a cation and a solvent, the anion and the cation are used in an equivalent amount, and the solvent in the obtained reaction liquid is evaporated away. The residue may be used directly as it is; or an organic solvent (e.g., methanol, toluene, ethyl acetate, acetone) may be further added thereto and the resulting liquid may be concentrated.

The ionic liquids may optionally be substituted with one or more groups selected from hydroxyl, cyano, vinyl, acrylate, methacrylate, epoxy, ether and carboxyl groups to provide additional reactivity and/or functionality to the ionic liquids. Ionic liquids substituted with mixtures of such groups may also be employed. Although not specifically defined, the amount of the ionic liquid to be added to the curable composition may be any amount which is sufficient for achieving at least some and preferably complete resin curing.

[Cyanate Ester Monomer]

With respect to the cyanate ester monomer, preferably the cyanate ester monomer has two or more cyanate ester groups bonded to a core which is an optionally substituted aryl, alkyl or aralkyl group. The core is depicted as R1 in the first structure of FIG. 12, however this structure in FIG. 12 does not show the additional cyanate ester group(s) bonded to the core. Preferably said cyanate ester monomer has two cyanate ester groups bonded to the core which is an optionally substituted aralkyl group having 2 or more phenyl rings. It is also possible for the cyanate ester monomer to have two cyanate ester groups bonded to phenyl rings of an alkylenebisphenyl group. Most preferably, the alkylene group of said alkylenebisphenyl group is an isopropylene (such as the core of Bisphenol A) or ethylidene, and the two cyanate ester groups are bonded at para positions of the phenyl rings.

It is also envisioned to be able to incorporate tricyanate esters, tetracyanate esters, or higher-order polycyanate esters in the curable composition.

Figure 2:
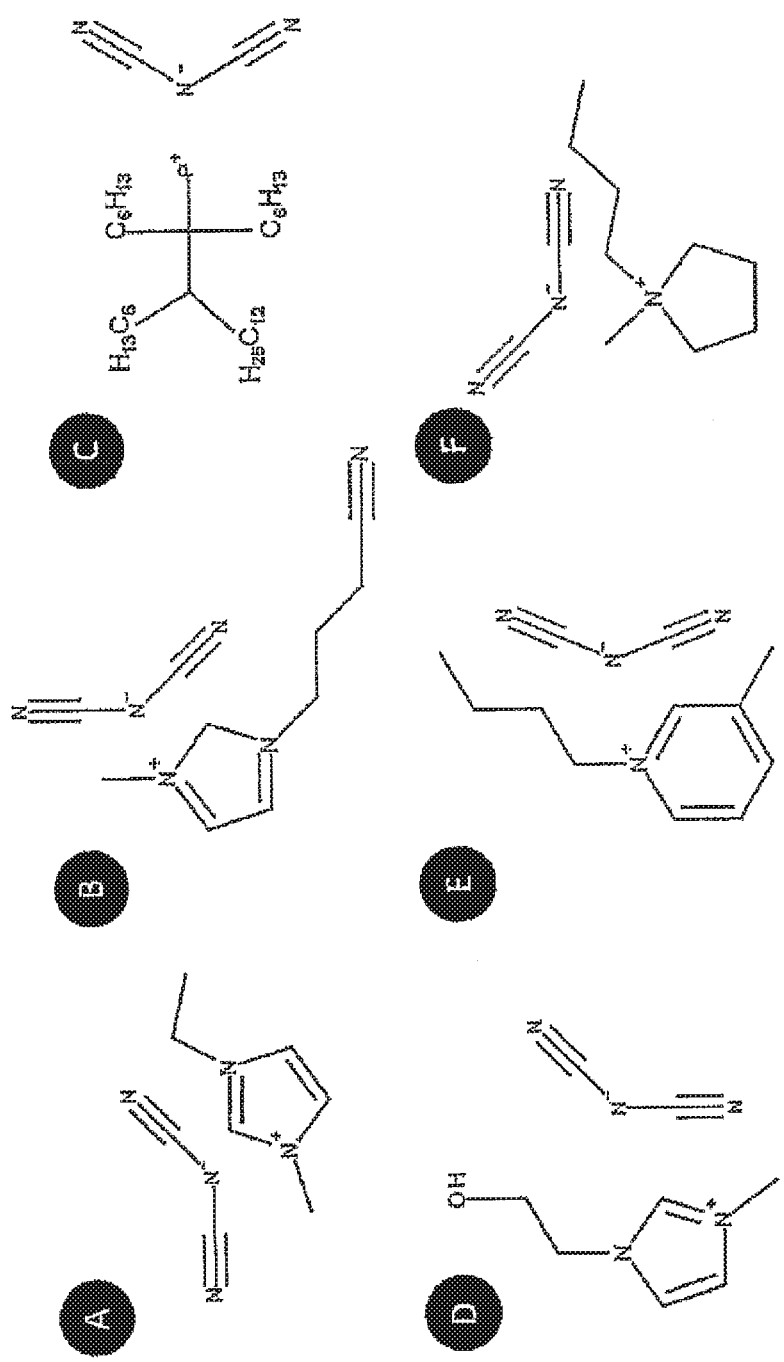
FIG. 2 shows the structures for a range of dicyanamide-containing ionic liquids used in the present invention.

In an embodiment, a dicyanate (Primaset LECY) and/or a polyphenolic (Primaset PT30) resin can be used as shown in FIG. 2.

The concentration of the cyanate ester monomer in the curable composition is 67 to 99.75 mol %, preferably, 90-99.75 mol % and most preferably, 95 to 99.75 mol %.

[Hydroxyl Donor]

Figure 12:
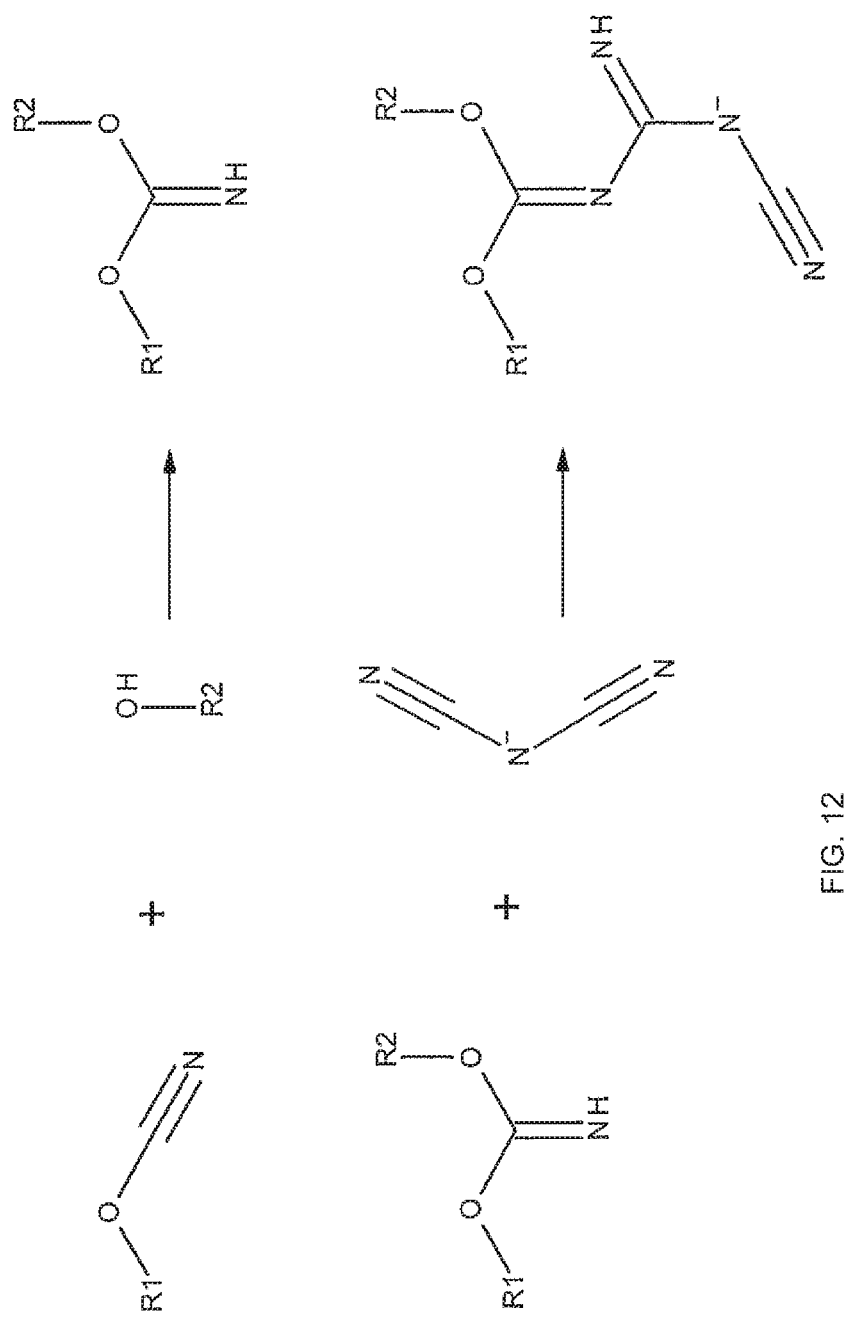
FIG. 12 is a structural diagram showing the mechanism of cyanate ester cure wherein the dicyanamide is incorporated into the triazine network structure.
Figure 12:
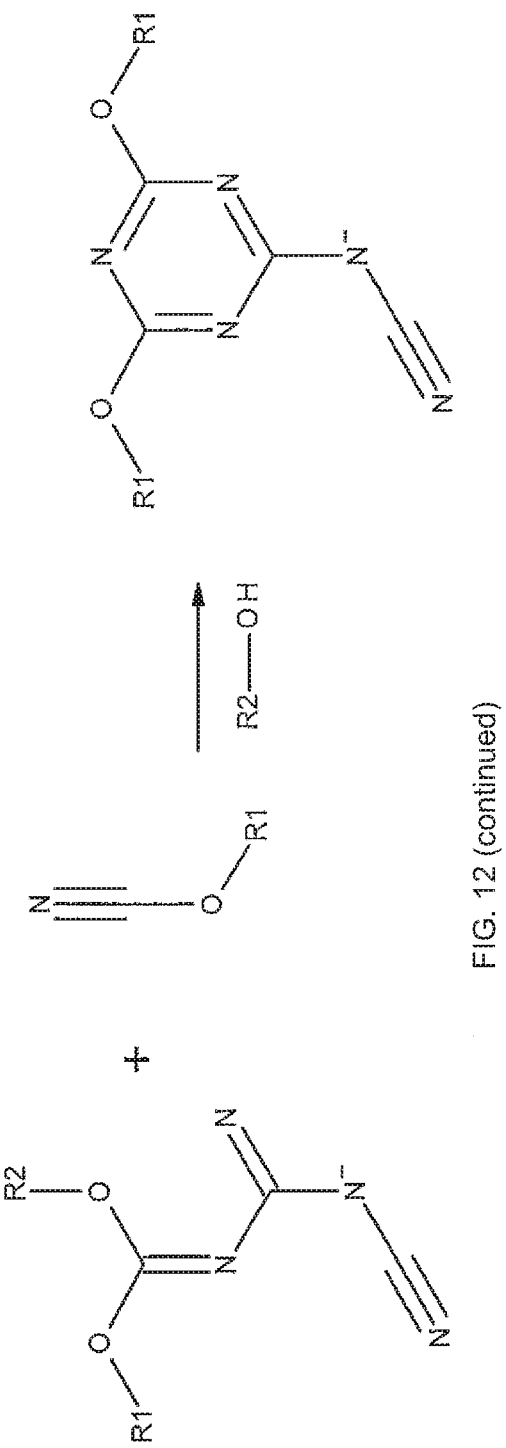

As noted in the mechanism described in FIG. 12, a hydroxyl donor can be present in the curable composition. However, it is preferred that no hydroxyl donor is added to the curable composition, but it is possible for there to be hydroxyl donor impurities which nevertheless can act as a catalyst as shown in FIG. 12. The hydroxyl donor can be any structure possessing a hydroxyl group accessible to the cyanate ester monomer. The hydroxyl donor can have a structure $R^2$—OH, wherein $R^2$ represents the residual structure of the hydroxyl donor, which could be reduced monomer, phenolic impurity, or just a hydrogen atom in the case of water. The amount of hydroxyl donor should be less than 1.5% of the RTIL, and the amount is negligible with respect to the cyanate ester concentration.

[Method of Preparation of Thermoset Polymer Having a Triazine Network]

An aspect of the invention is a method of preparing a thermoset polymer having a triazine network comprising combining, in any order, the following:

(a) a cyanate ester monomer; and (b) at least one ionic liquid comprising a dicyanamide anion;

to form a mixture, and heating the mixture to a temperature sufficient to cause a curing reaction to thereby form the thermoset polymer having a triazine network.

An advantage of the present invention is the fact that the curing temperature can be decreased by using the RTILs without the need for added metal catalysts. The temperature of the curing reaction can be 80-350 C. Preferably, the curing temperature is 90-350 C. Most preferably, the curing temperature is 105-350 C.

[Cured Thermoset Polymer Having Triazine Rings]

An aspect of the invention is a thermoset polymer having a network comprised of triazine rings (Formulae 1-3). The unique aspect of this invention is that at least some rings incorporate a dicyanamide anion (Formula 1). Alternatively, some dicyanamide ions may be incorporated into two adjacent rings, providing an ionic amine linkage between them. (Formula 2). In the case of anionic structures, an associated cation must be present, and can vary in structure. Depending on the ratio of dicyanamide to cyanate ester monomer, some rings may also have no dicyanamide structure (Formula 3).

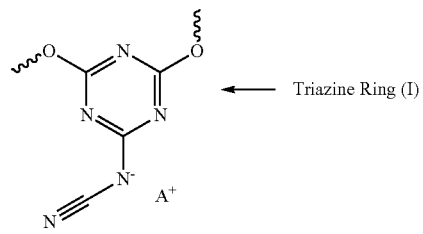

Formula 1

← Triazine Ring (I)

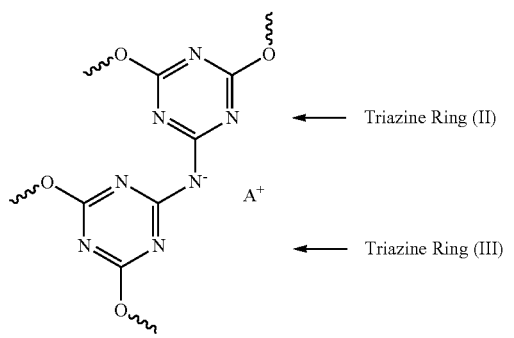

Formula 2

← Triazine Ring (II)

← Triazine Ring (III)

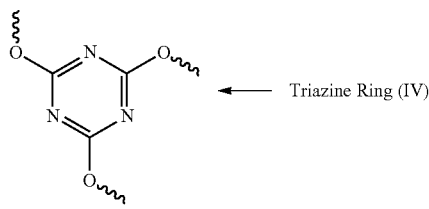

Formula 3 — Triazine Ring (IV)

As shown in Formula 1, the inventive thermoset polymer has a triazine network, wherein the polymer can comprise a triazine ring (I) bonded to two oxygen atoms and a nitrogen anion. Each of the two oxygen atoms are members of a different cyanurate ester functional group connected to the network, and wherein the nitrogen anion is bonded to a carbon atom of a cyano group.

As shown in Formula 2, the thermoset polymer having a triazine network can comprise a triazine ring (II) bonded to two oxygen atoms and a nitrogen anion, wherein each of the two oxygen atoms are members of a different cyanurate ester functional group connected to the network, and wherein the nitrogen anion is bonded to a triazine ring (III).

A+ as shown in Formulae 1 and 2 can be any cation that does not adversely affect the properties of the thermoset polymer.

As shown in Formula 3, the thermoset polymer having a triazine network can comprise a triazine ring (IV) bonded to three oxygen atoms, wherein each of the three oxygen atoms are members of a different cyanurate ester functional group connected to the network, as shown in Formula 3.

In an embodiment of the invention, the thermoset polymer having a triazine network has all of Formulae 1, 2 and 3. In another embodiment, the thermoset polymer having a triazine network has Formulae 2 and 3. In yet another embodiment, the thermoset polymer having a triazine network has Formula 1. Moreover, in another embodiment, the thermoset polymer having a triazine network has Formulae 1 and 3.

As shown in the mechanism of FIG. 12, the dicyanamide anion becomes part of the triazine ring structure as the triazine ring is formed. The amount of dicyanamide anion that becomes incorporated into the triazine rings making up the backbone of the polymer or resin is essentially proportional to the amount of dicyanamide anion added to the curable composition. Theoretically, a triazine ring can be formed from 2 cyanate ester monomers and 1 dicyanamide anion. This means that the dicyanamide anion can form up to 33% of the ring structure (i.e., 1 carbon atom and 1 nitrogen atom of the triazine ring). In addition, it is possible for the polymer or resin to have a mixture of triazine rings which are formed from 3 cyanate ester monomers along with triazine rings which are formed from 2 cyanate ester monomers and 1 dicyanamide anion. In this way, the amount of ionic character of the polymer or resin can be tailored.

As mentioned above, the inventive thermoset polymer having a triazine polymer has no added metals used to catalyze the synthesis of the polymers. This provides an advantage over conventional polymers synthesized with metal catalysts, because the metals remaining in conventional polymers can also catalyze the degradation of the polymer when the polymer is exposed to high temperatures. As such, the inventive thermoset polymer having a triazine polymer has a high resistance to: i) network degradation; ii) Tg loss under humid conditions; and iii) blistering. For instance, the inventive thermoset polymer having a triazine network has a glass transition (Tg) temperature of 180 to 400 C. Preferably, the Tg is 220 to 370 C, and most preferably, the Tg is 260 to 360 C.

[Materials]

FIG. 2 shows the structures for a range of dicyanamide-containing ionic liquids used in the examples. These include 1-ethyl-3-methyl imidazolium dicyanamide, 1-(3-cyanopropyl)-3-methyl imidazolium dicyanamide, trihexyltetradecylphosphonium-dicyanamide, 1-(2-hydroxyethyl)-3-methyl-imidazolium dicyanamide, 1-butyl-3-methyl pyridinium dicyanamide, and 1-butyl-1-methyl-pyrrolidinium dicyanamide. These were purchased from Sigma Aldrich and used as received. C,C'-(ethylidene di-4,1-phenylene)ester ("LECY" or "Bisphenol E Dicyanate Ester") and oligo(3-methylene-1,5-phenylenecyanate) (Primaset PT-30) were obtained as a research sample from Lonza, Inc. and used as received. These structures give the advantage of accelerating the cure of cyanate ester resins.

Figure 3:
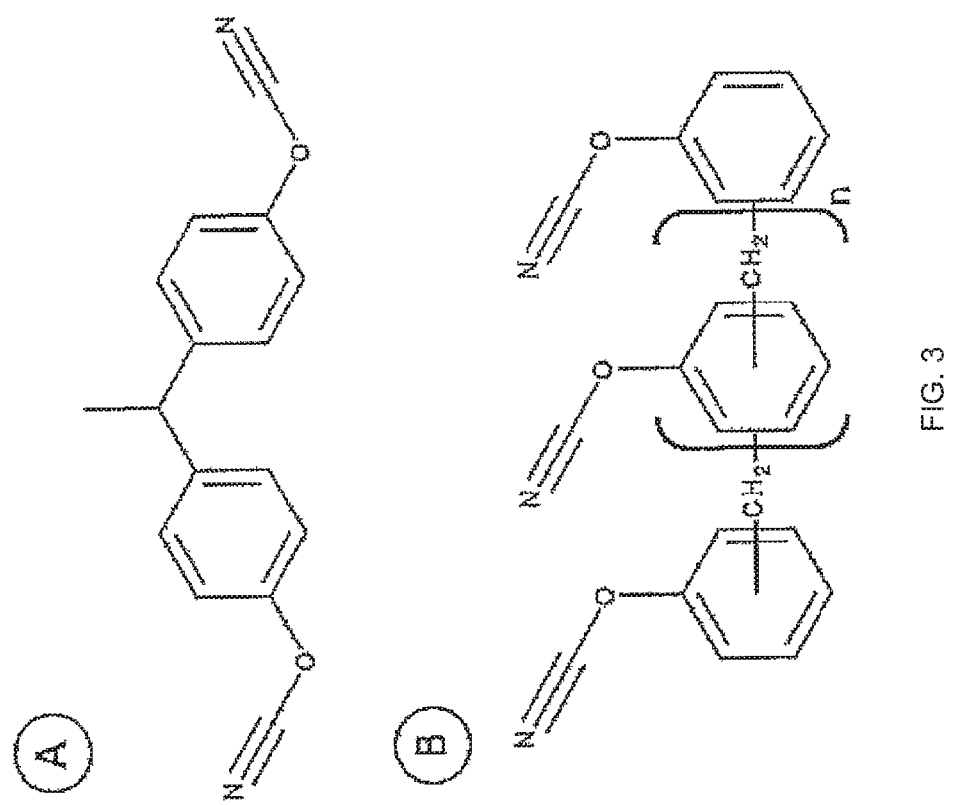
FIG. 3 shows the structure for (A) Primaset LECY (C,C'-(ethylidene di-4,1-phenylene)ester) and (B) Primaset PT-30 (Oligo(3-methylene-1,5-phenylenecyanate)).

FIG. 3 shows the structures of two preferred cyanate esters. Specifically, structure (A) is of Primaset LECY (C,C'-(ethylidene di-4,1-phenylene)ester) and structure (B) is of Primaset PT-30 (Oligo(3-methylene-1,5-phenylenecyanate)).

The following examples are illustrative, but not limiting, of the methods and compositions of the present disclosure. Other suitable modifications and adaptations of the variety of conditions and parameters normally encountered in the field, and which are obvious to those skilled in the art, are within the scope of the disclosure.

[Calorimetry]

Liquid samples were mixed in a 20 ml vial, and 10-20 mg samples removed for testing. Samples were crimped into a TA Instruments Q 2000 Differential Scanning Calorimeter ("DSC") having a hermetically sealed DSC pan and run through a temperature ramp procedure from room temperature to 350° C. at a ramp rate of 10° C./min (for IL/LECY) or 5° C./min (for IL/PT-30) (wherein PT-30 is a polyphenolic cyanate ester).

[FTIR]

Liquid samples were mixed in a 20 ml vial and placed between two 25 mm diameter×4 mm thickness NaCl single-crystal optical elements with a 25 µm spacer. This salt plate apparatus was placed in an isothermal aluminum cell inside a Thermo-Nicollet 6700 FTIR spectrometer. A series of transmission spectra were taken with a resolution of 8 cm$^{-1}$. Degradation samples were measured in a Thermo Nexus 670 near-FTIR, with the transmission beam passing directly through the treated 1.5 mm-thick sample.

[Dynamic Mechanical Analysis ("DMA")]

0, 0.5, 1, 2, 5, and 10% EMIM-DCN ("EMIM" is 1-ethyl-3-methyl imidazolium) in LECY Samples were poured into 60×15×4 mm rectangular molds, and cured at 80° C./12 h, 100° C./4 h, 120° C./4 h, 150° C. 2 h, followed by a 300° C. post-cure for 1 h ("slow" cure pathway). For hydrolytic degradation testing, 2% w/w EMIM-DCN samples with a 30×12×3 mm rectangular size were cured at 105° C./12 h, 130° C./2 h, 220° C./2 h, followed by a post-cure at 300 C for 1 h ("fast" cure pathway). To determine $T_g$ for all samples, DMA was performed in a TA Instruments 2980 DMA from room temperature to 350° C. with a temperature ramp of 2° C./min.

[Humidity Conditioning]

DMA samples were conditioned and monitored following the procedure of Marella et al., supra. This procedure involves long-time humidity conditioning (up to 5 weeks @85° C./85% RH), thermal drying, and analysis by gravimetric mass uptake, mass-calibrated near-FTIR, and DMA.

This method explicitly measures both degree of hydrolysis (by mass and IR) and the consequences of that hydrolysis on the temperature performance of the polymer. Data for 2% w/w EMIM-DCN in LECY were compared with LECY samples catalyzed with 2 phr nonylphenol/160 ppm $Cu^{2+}$.

[Batch Synthesis]

An exemplified embodiment of the present invention of the formulation and cure procedure is presented as follows. Mix 5% by weight EMIM-DCN into a solution of Primaset LECY with a sonicator, rotational mixer, or impeller-driven mixer. After mixing, degas under vacuum. Pour the solution into molds of the desired shape for thermal curing. Cure at 105° C. for 12 h, 130° C. for 2 h, and 220° C. for 2 h. At this stage, the network has gelled and the part will retain shape. If desired, the part can be removed from the mold. Optionally within or without the mold, the part can be post-cured at 300° C. for one hour.

[Results]

Calorimetry, FTIR, and DMA were used to characterize the interaction between LECY and dicyanamide-containing ionic liquids. DSC shows the effect of cure acceleration by concentration and cation type. DMA on cured samples shows the effect of initiator and thermal history on $T_g$. Isothermal, time-resolved FTIR spectroscopy separately shows the interaction between DCN anions and cyanate ester functional groups, the formation of triazine rings, the formation of reaction intermediates, and the formation of side-products.

In addition to curing studies, a humidity-conditioning degradation experiment was run, comparing 2% EMIM-DCN with a typical metal/hydroxyl catalyst system (2 phr nonylphenol/150 ppm $Cu^2$). This experiment included dry and wet mass uptake, Tg drop by DMA, and near-FTIR spectroscopy to determine the nature of the degradation reaction.

[Calorimetry]

Figure 4:
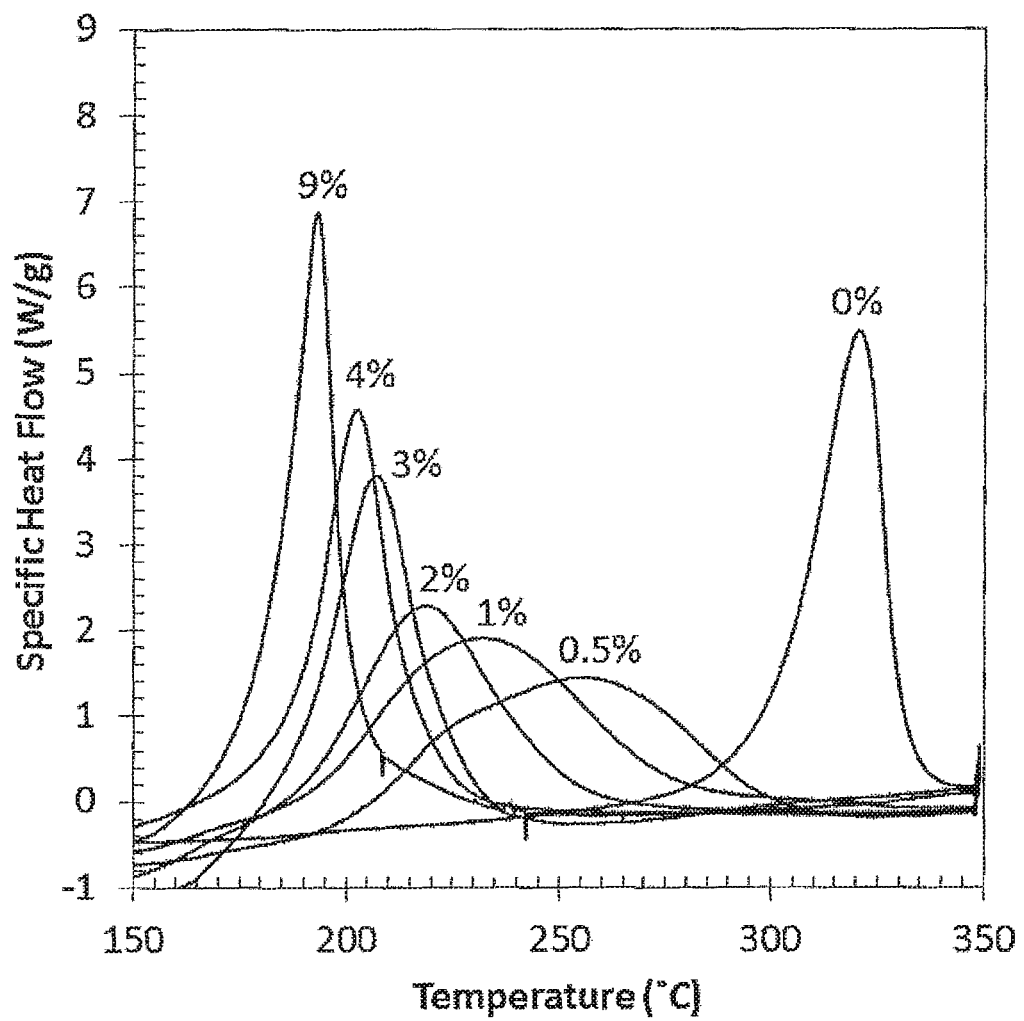
FIG. 4 is a graph of calorimetric curves obtained using a 10° C./min temperature ramp for various concentrations of EMIM-DCN in LECY.

FIG. 4 shows results of a 10° C./min temperature ramp for various concentrations of EMIM-DCN in LECY. EMIM-DCN shows a strong effect on cure temperatures, even at low concentrations.

Figure 5:
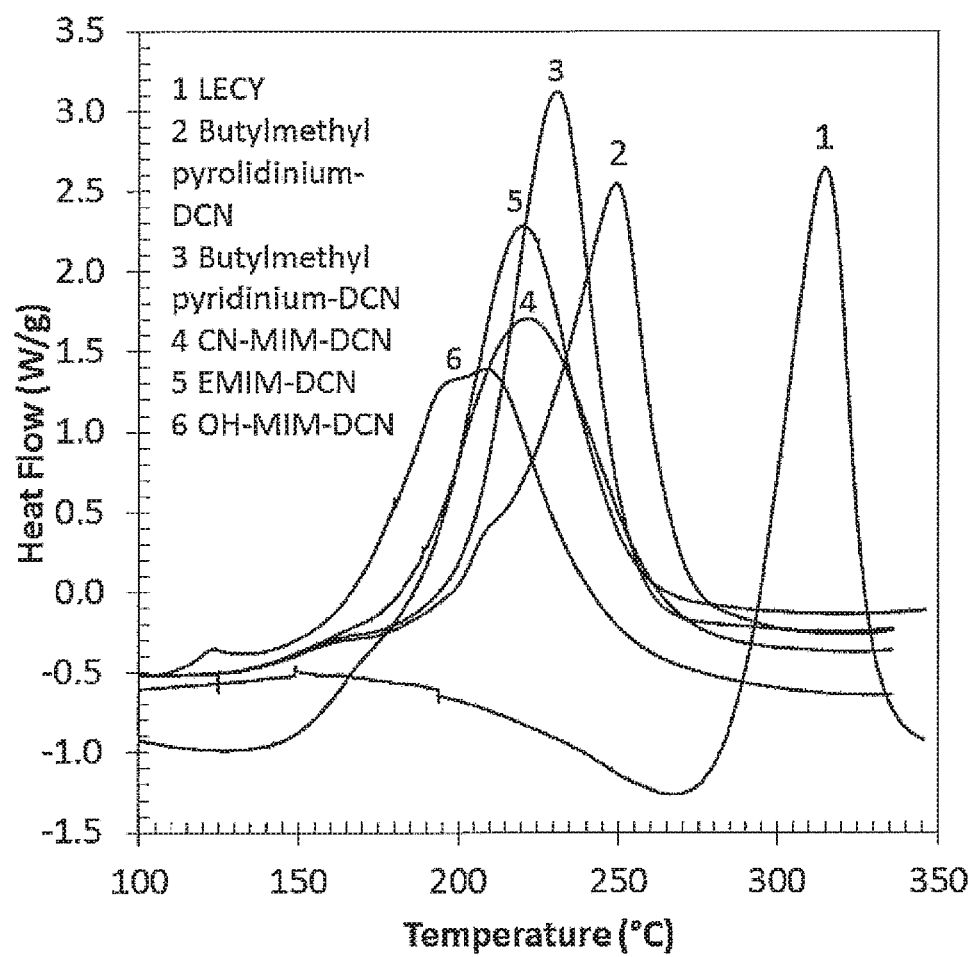
FIG. 5 is a graph showing an acceleration of cure by 2% w/w with various ionic liquids and LECY.

Five other DCN-containing RTILs were tested under the same conditions, including: 1-butyl-3-methyl imidazolium dicyanamide (BMIM-DCN), 1-butyl-3-methyl pyridinium dicyanamide (BMPyridinium-DCN), and 1-butyl-1-methylpyrrolidinium dicyanamide (BMPyrrolliinium-DCN), 1-(3-cyanopropyl)-3-methyl imidazolium dicyanamide (CN-MIM-DCN), 1-(2-hydroxyethyl)-3-methylimidazolium dicyanamide (OHMIM-DCN) at equivalent molarities. All DCN-containing RTILs significantly accelerated cure. OHMIM-DCN cured at a slightly lower temperature than the others, likely acting as a hydroxyl donor in addition to the DCN interaction. FIG. 5 shows an acceleration of cure by 2% w/w with various ionic liquids and LECY. All DCN-containing RTILs show cure acceleration, with OHMIM-DCN showing the greatest degree due to the presence of a hydroxyl group in the cation.

Figure 6:
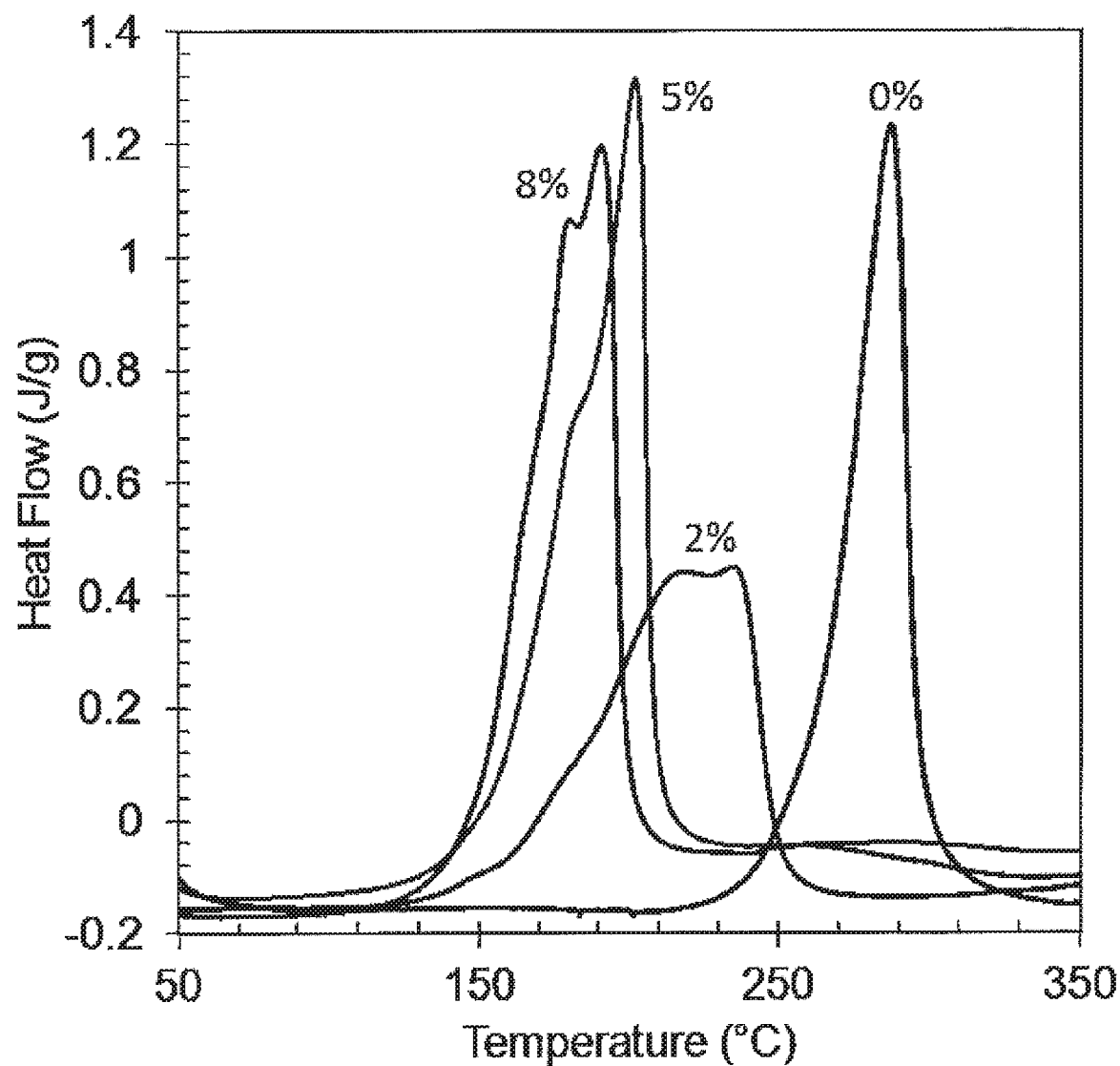
FIG. 6 is a plot showing curing calorimetry of EMIM-DCN and PT-30, which shows an acceleration effect and a possible two-step mechanism.

FIG. 6 shows the exothermic cure of EMIM-DCN at varying weight fraction mixed with Primaset PT-30, a polyphenolic cyanate ester. In this system, a similar cure acceleration was observed, although the presence of two peaks suggests different curing behavior than the LECY/IL systems.

[Glass Transition Temperature of Cured Resins]

Figure 7:
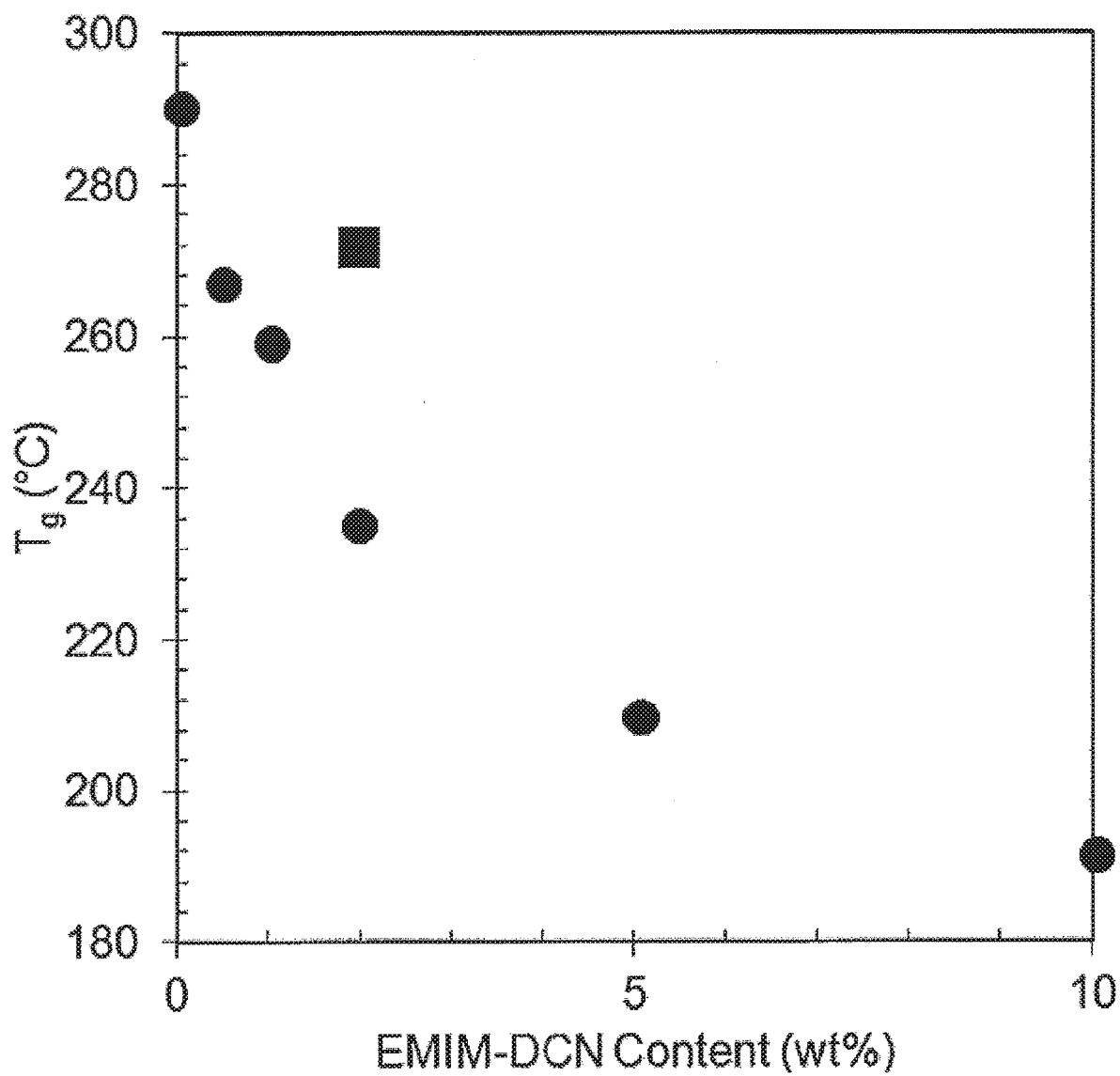
FIG. 7 is a plot showing the $T_g$ of resins cured with a range of EMIM-DCN content according to a slow cure schedule, in addition to one sample cured according to a faster schedule.

FIG. 7 shows the $T_g$ of resins cured with a range of EMIM-DCN content according to a slow cure schedule, in addition to one sample cured according to a faster schedule. The slow cure schedule results show a plasticization effect with increasing EMIM-DCN content, with nearly 100° C. decrease in glass transition temperature at 10% loading. A faster cure schedule yielded a significantly higher $T_g$ for 2% EMIM-DCN in LECY.

[FTIR]

Figure 8:
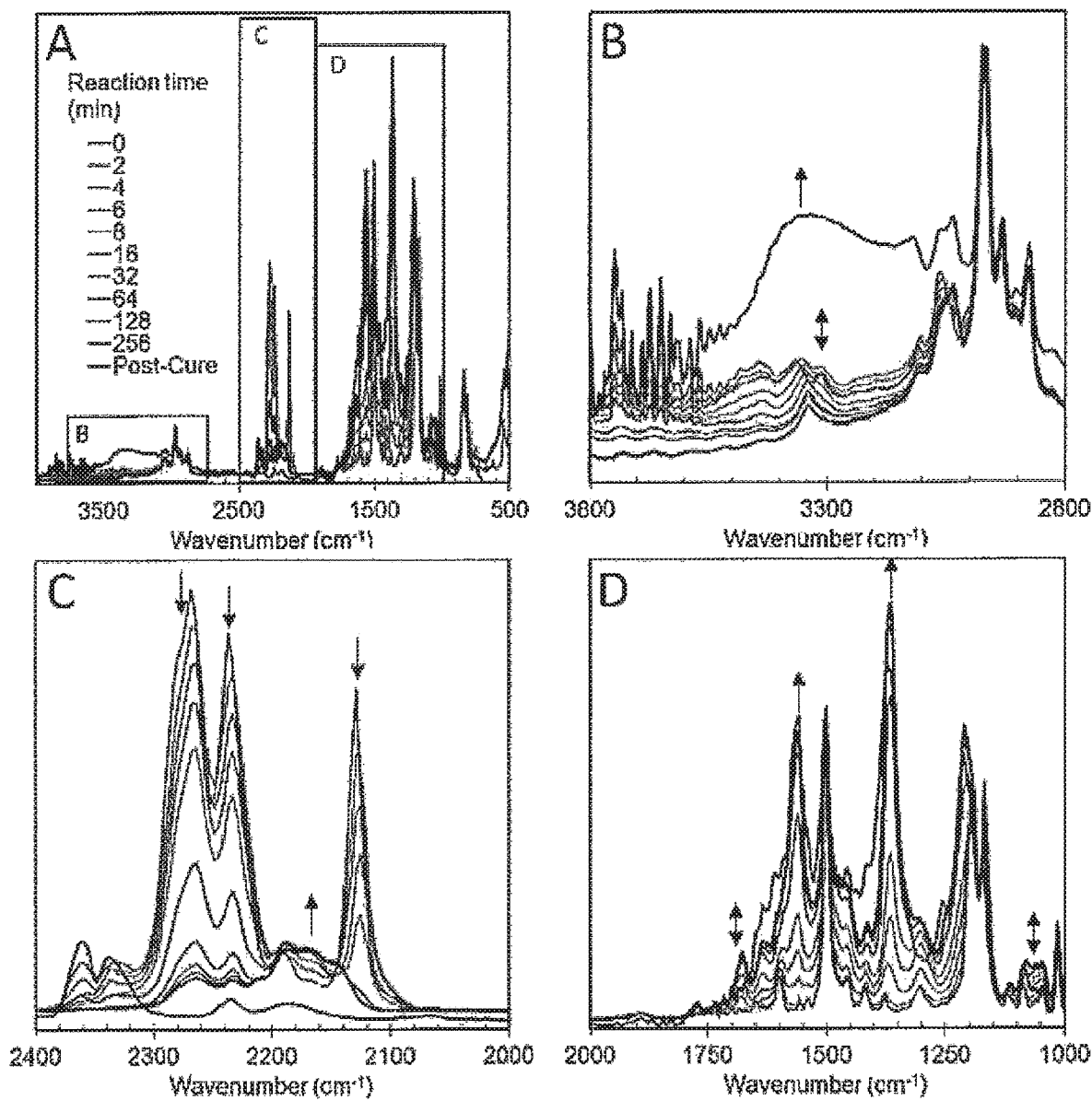
FIG. 8 is a plot showing the FTIR spectra of 10% EMIM-DCN in LECY, run isothermally at 150° C. and post-cured for 1 h at 300° C.

FIG. 8 shows the FTIR spectra of 10% EMIM-DCN in LECY, run isothermally at 150'C and post-cured for 1 h at 300° C. The full spectra (FIG. 8A) has three significant regions of interest, including: the hydrogen stretching (C—H, N—H, and O—H) between 3800-2800 $cm^{-1}$ (FIG. 8B), the cyanate stretching (cyanate ester and dicyanamide) between 2400-2000 $cm^{-1}$ (FIG. 8C), and the polymer fingerprint region (FIG. 8D). The primary observed results are the reduction of cyanate ester and dicyanamide peaks, the increase of triazine peaks, and the transient appearance of peaks representing an intermediate structure. Secondary observations include the formation of a new cyanate peak, the formation of a new hydroxyl structure, and the overall stability of the peaks throughout the fingerprint region and C—H stretching region. Table 4 shows a listing of prominent peaks that change in intensity over the course of the experiment.

TABLE 1

Peak locations, dynamic behavior, and assignment for EMIM-DCN FTIR Cure

| Wavenumber (cm−1) | Motion | Assignment |
| --- | --- | --- |
| 3350 | Up (late) | Hydroxyl |
| 3340 | Transitory | Amine N—H |
| 2267 | Down | OCN |
| 2233 | Down | DCN and OCN |
| 2194 | Down | dicyanamide |
| 2171 | Up | Triazine-NCN |
| 2130 | Down | dicyanamide |
| 1677 | Transitory | C=N |
| 1565 | Up | Triazine |
| 1501 | Static | LECY Aryl Backbone |
| 1369 | Up | Triazine |
| 1307 | Down | |
| 1191 | Shifted | Ar—O |
| 1169 | Down | O—CN |
| 1060 | Transitory | C—N |

The cyanate region shows peaks for both cyanate ester (2267 and 2233 $cm^{-1}$) and dicyanamide (2225, 2194, and 2130 $cm^{-1}$). Additionally, a new peak at 2171 $cm^{-1}$ is formed, although it disappears after the post-cure. For analytical purposes, the peak at 2267 $cm^{-1}$ is useful as a marker for the cyanate ester functionality, while the peak at 2194 $cm^{-1}$ is useful as the marker for dicyanamide functionality. The peak at 2233 $cm^{-1}$ appears as a composite of two peaks that appear at similar locations, the 2233 $cm^{-1}$ 1 peak of cyanate ester and the 2225 $cm^{-1}$ peak of dicyanamide. As both decrease together, it is expected to have the same behavior, but is less analytically useful due to the overlap. The new peak formed at 2171 $cm^{-1}$ is likely a cyanate peak.

The spectroscopy of triazine formation shows two peaks at 1563 and 1366 cm, indicating that the resin product is the same triazine ring as in the metal- and auto-catalyzed case. Significantly, the saturation of the triazine peaks occurs more slowly than the decrease in cyanate groups, indicating the presence of an intermediate. Also appearing in the fingerprint region are two transient peaks at 1677 and 1060 $cm^{-1}$. They trend together, peaking at a relatively short time, and slowly decreasing over the remainder of the experiment.

These peaks provide clues as the identity of the reaction intermediate, and likely correspond to C=N and C—N stretching, respectively.

Two peaks are used for reference. In the fingerprint region, the aromatic C—C stretching of the bisphenol E polymer backbone (from LECY) at 1501 cm$^{-1}$ provides a convenient reference peak for quantitative analysis. Additionally, the 2973 cm$^{-1}$ aromatic C—H stretch, also corresponding to the Bisphenol E polymer backbone, provides a redundant, roughly equivalent reference. Comparing analysis performed based on either of the reference peaks yielded practically indistinguishable results, confirming that the effects noted in this section are fundamental, rather than artifacts of wavelength-based FTIR intensity effects.

[Humidity Conditioning]

In order to test for hydrolytic degradation behavior, the methodology of Marella et al., supra, was used to compare 2% EMIM-DCN and unpublished results from our research group on 2 phr nonylphenol/160 ppm Cu$^{2+}$ catalyzed LECY. Samples were dried, humidity conditioned, and then re-dried after conditioning. After cycling, mass uptake, near-FTIR, and DMA measurements were taken. Mass uptake corresponds to hydrolysis product formation, the nature of which is corroborated by FTIR. DMA indicates the degree to which hydrolytic degradation affects $T_g$.

Figure 9:
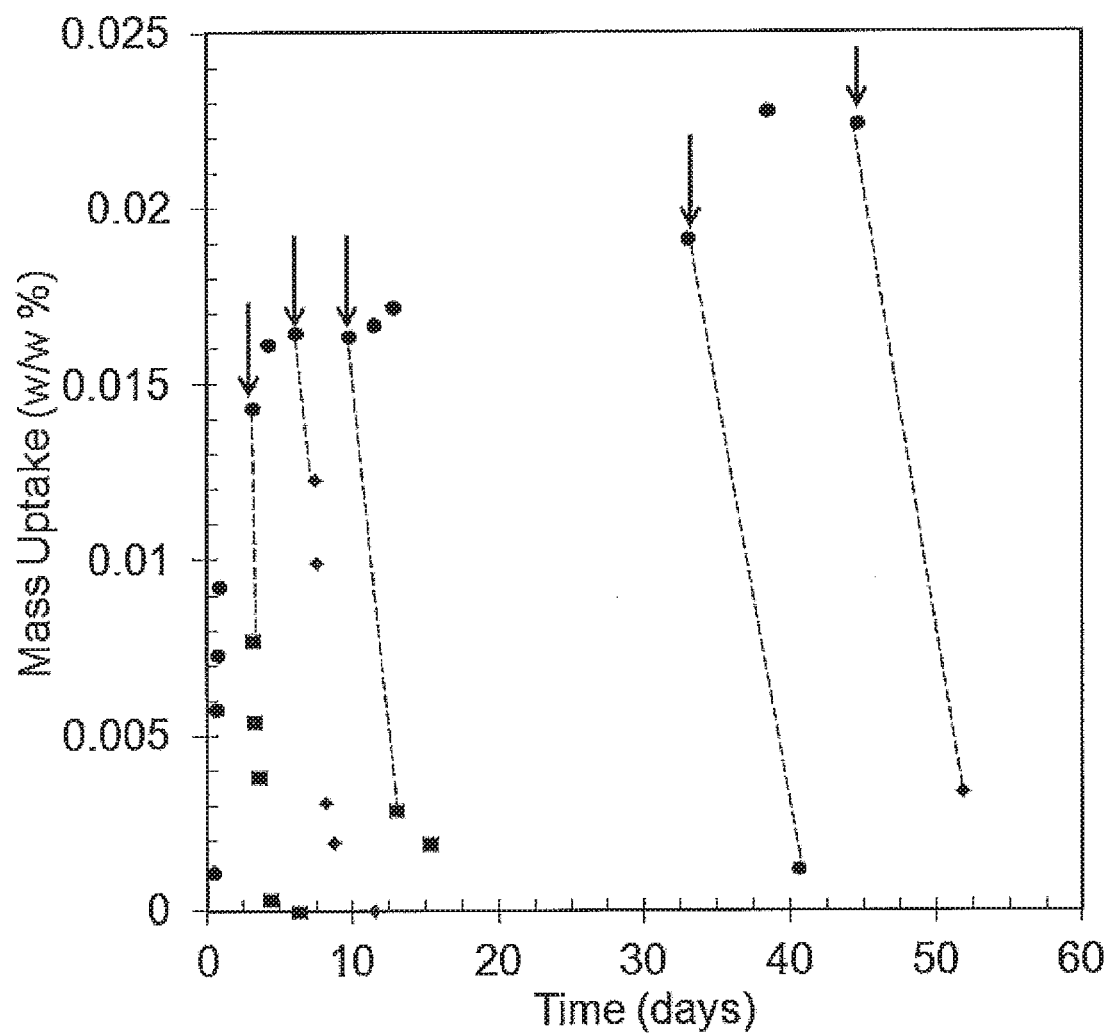
FIG. 9 is a plot showing the mass uptake data from the 85° C./85% RH humidity conditioning experiment.

FIG. 9 shows the mass uptake data from the 85° C./85% RH humidity conditioning experiment. The primary water uptake shows a monotonic increase. Water sorption occurs during the first three days, after which mass continues to increase linearly due to hydrolysis reaction products. The arrows in FIG. 9 indicate the times at which samples were removed for drying, i.e., 3 days(■), 1 week(♦), 2 weeks(■), 5 weeks(●), and 6 weeks(♦). The mass increase of those dried samples, indicated by the lower points, are the result of the hydrolysis reaction products.

Figure 10:
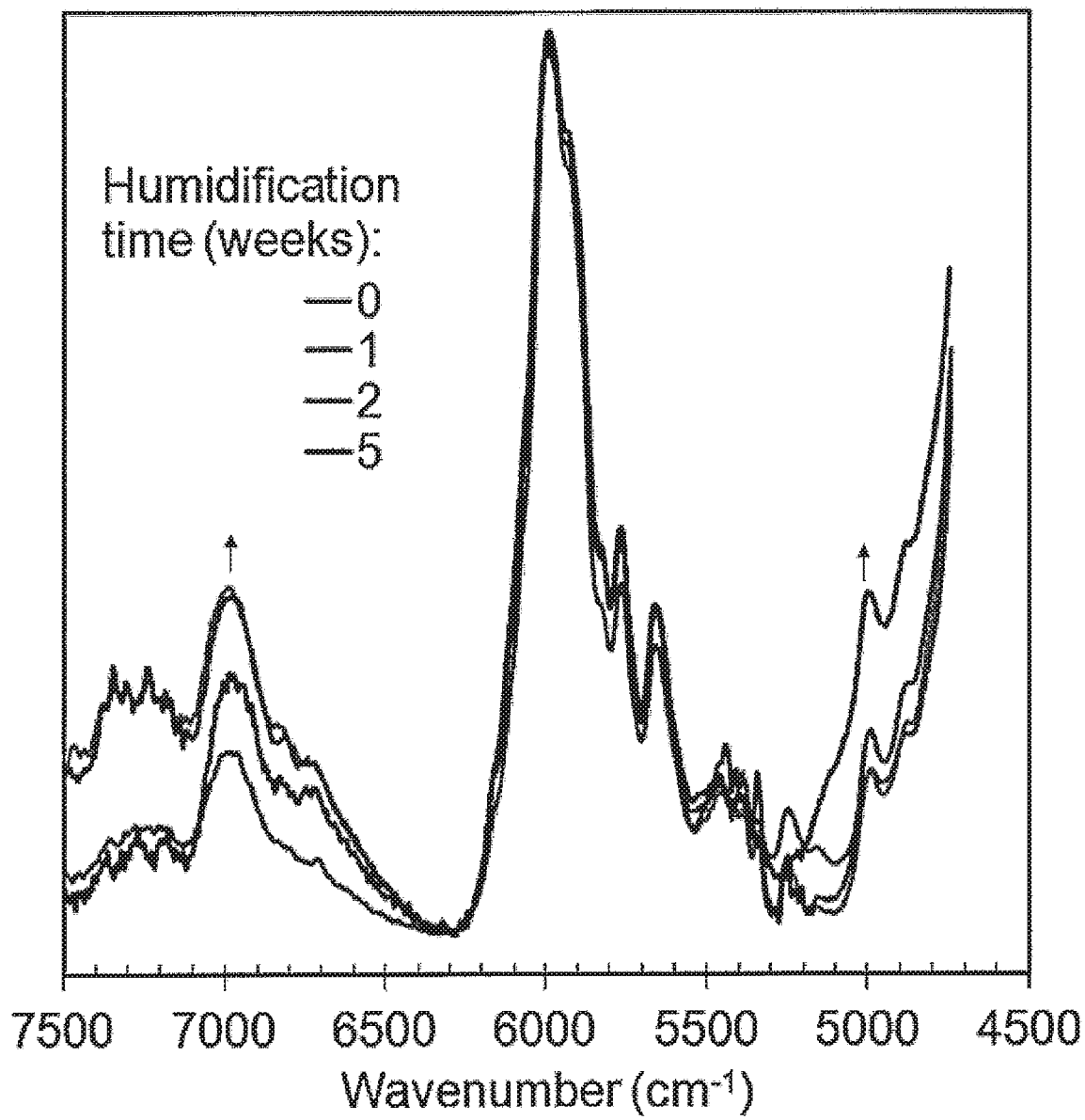
FIG. 10 is a plot of the near-FTIR spectra untreated, cured EMIM-DCN/LECY, and the dry results of 1-5 weeks of humidity treatment.

The identity of the mass uptake results is verified by near-FTIR. FIG. 10 shows near-FTIR spectra untreated, cured EMIM-DCN/LECY, and the dry results of 1-5 weeks of humidity treatment. Of particular note are the reference peak at 5990 cm-1 and the —OH stretching peak at 4991 cm$^{-1}$.

Hydrolytic degradation affects glass transition temperature. FIG. 10 shows the drop in glass transition temperature upon exposure to an 85° C./85% RH humidity environment and subsequent drying for 2% w/w EMIM-DCN in LECY compared to LECY cured by 150 ppm Cu$^+$ and 2 phr nonylphenol.

Figure 11:
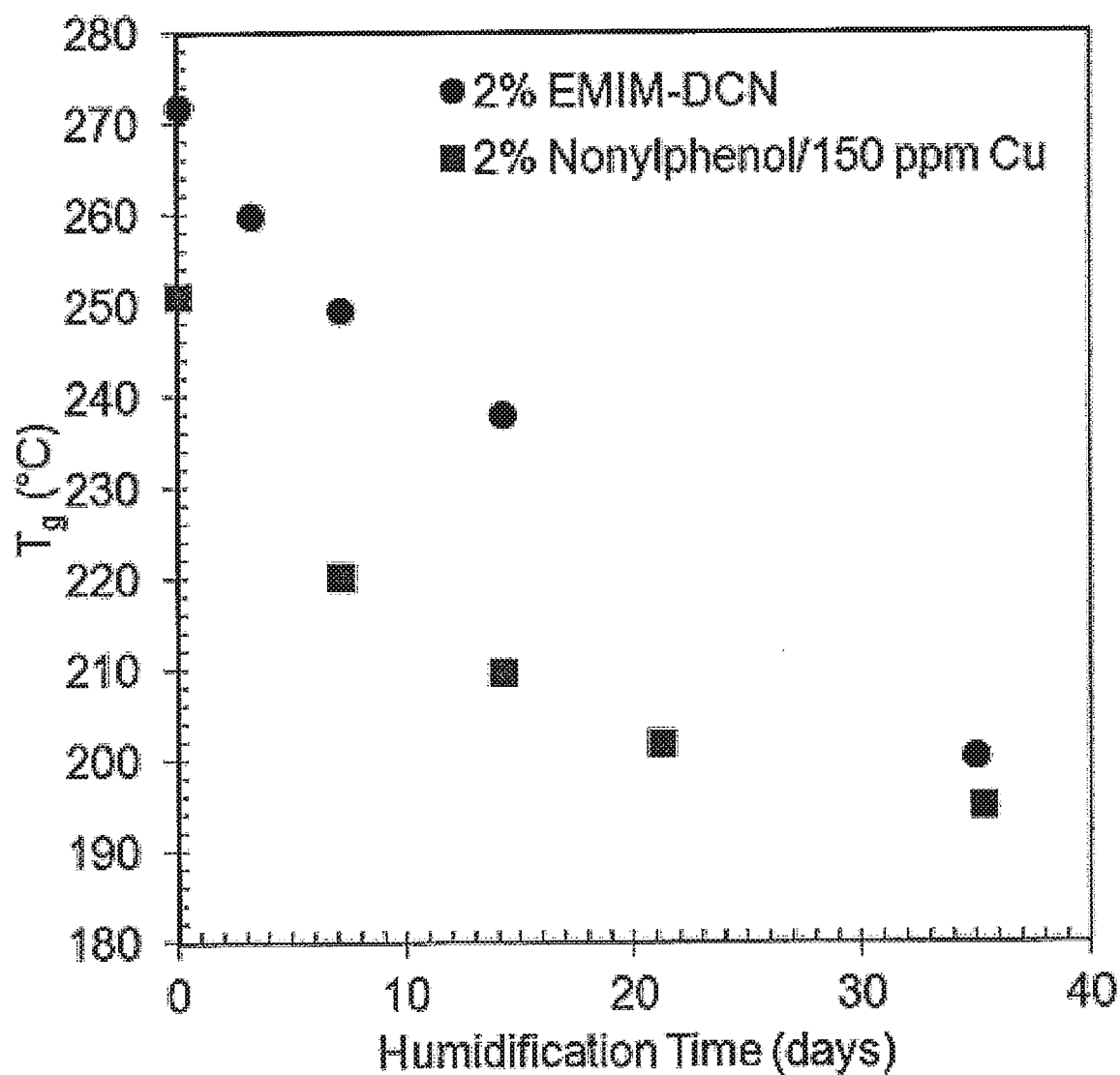
FIG. 11 is a plot showing the Tg reduction to hydrolytic degradation of polymer exposed to an 85% RH/85° C. humidity environment.

FIG. 11 shows the $T_g$ reduction to hydrolytic degradation of polymer exposed to an 85% RH/85C humidity environment.

[Reaction Mechanism]

Without being bound to theory, it is believed based on the FTIR data (Table 1, FIG. 8) that several things can be directly observed about the interaction between dicyanamide and cyanate ester. The primary cyanate ester reaction occurs simultaneously with a reaction involving the dicyanamide anion. The disappearance of cyanate groups chronologically precedes the appearance of triazine rings. Corresponding to this time gap, transient bonds that peak between cyanate disappearance and triazine appearance indicate a reaction intermediate with new C—N, C=N, and amine functions. Finally, the triazine bonds formed in this reaction appear where indicated in literature, demonstrating that a standard triazine ring is formed from this reaction.

The dicyanamide anion is herein referred to as an initiator, and not a catalyst, because the dicyanamide anion becomes part of the triazine ring.

The decrease in dicyanamide (2130 cm$^{-1}$), corresponding in time to the decrease in cyanate ester groups (2267 cm$^{-1}$), indicate that the dicyanamide group is participant in the primary reaction. Further, the appearance of a shifted peak in the cyanate region (2171 cm$^{-1}$), indicates a change in the structure to which the cyanate is bonded. Thus, the dicyanamide is present in the triazine ring structure, leaving an unreacted cyanamide. Finally, based on the appearance of a large hydroxyl peak (3350 cm$^{-1}$) and the disappearance of the shifted cyanate peak (2171 cm$^{-1}$), it is presumed that this cyanamide is further hydrolyzed during post-cure.

FIG. 11 shows the relative rates of the cyanate ester decrease, triazine increase, and intermediate formation. Three transient peaks hint at the identity of the reactive intermediate. The two peaks at 1677 cm$^{-1}$ and 1060 cm$^{-1}$ correspond well to the expected locations of double and single CN bonds, respectively. The presence of a narrow amine peak at 3340 cm$^{-1}$ suggests the presence of an amine group as well.

FIG. 12 shows a possible version of the primary reaction mechanism. This model still assumes the importance of adventitious water and hydroxyl containing impurities. It incorporates the dicyanamide structure directly into the triazine ring, leaving a single cyanamide group with a different molecular environment. As such it is consistent with the FTIR data presented above. It should be noted that all possible side reactions have not been considered, and that alternative structures, should not be discounted.

With respect to side reactions, cyanate ester synthesis is complicated with monomer carbamate formation, and the cured resin is affected by hydrolytic degradation through both ring-opening and chain scission mechanisms. In addition to those reactions, the cyanamide group attached to triazine ring from this mechanism (representing the cyanate peak at 2171 cm$^{-1}$) show signs of hydrolysis during the high temperature post-cure, simultaneous to the appearance of a broad hydroxyl peak (3350 cm$^{-1}$). This demonstrates that an additional side reaction that should be considered is the reduction of unreacted cyanamides. Since this reaction does not affect the network structure, the $T_g$ is unlikely to be affected by this side reaction.

[Plasticization]

The observed loss of $T_g$ with increasing RTIL content and the variance with cure schedule (FIG. 7) could be attributed to competing side-reactions, a reduction in achievable cure, or a decreased cross-linking density. The absence of a carbonyl peak indicates that carbamate formation was not significant in the reaction schemes pursued for FTIR analysis. The complete extinction of cyanate ester peaks (2267 cm$^{-1}$) indicates the complete reaction of the monomer. The ultimate heights of the triazine peaks vary both with RTIL content and curing schedule, suggesting that cure procedure optimization is possible to maximize full polymer cure. Finally, the decreased cross-linking density of the dicyanamide anion relative to the LECY monomer would decrease the $T_g$ systematically with increased RTIL content.

Cross-linking density is reduced as the dicyanamide replaces a LECY monomer. While the dicyanamide does have two functional groups, the small size and limited flexibility of the amide linker between them effectively prevents the reaction of both end groups. However, it is possible that both end cyanate groups of dicyanamide react.

[Water Uptake and Degradation]

Water uptake, hydrolytic degradation rates, and $T_g$ dropoff were compared for 2% w/w EMIM-DCN cured LECY and Cu$^{2+}$/nonylphenol cured LECY. Equilibrium water uptake was determined from mass uptake (FIG. 9). Additionally, following the methodology of Marella et al., supra, hydrolytic degradation rates were determined from both mass uptake (FIG. 9) and mass-calibrated near-FTIR (FIG. 10). Finally, $T_g$ dropoff following humidity conditioning (FIG. 11) was determined versus humidity exposure time. Table 2 shows the side-by-side results of these parameters. These results suggest that compared to the conventionally catalyzed system, an ionic liquid catalyzed system displayed lower equilibrium water sorption and a similar hydrolytic degradation rate by both mass and FTIR. The EMIM-DCN cured sample showed slower $T_g$ dropoff initially, but continuing degradation resulted in greater dropoff after 5 weeks of high humidity.

TABLE 2

| Water dynamics within LECY polymers cured with | | | | | |
|---|---|---|---|---|---|
| | Equilibrium Uptake (%) | Degradation rate (mass) | Degradation rate (mass-IR) | $T_{g0} - T_g$ (2 weeks) | $T_{g0} - T_g$ (5 weeks) |
| EMIM-DCN | 1.5 | $4.7 \times 10^{-9}$ | $5.8 \times 10^{-9}$ | −32° C. | −70° C. |
| $Cu^{2+}$/nonylphenol | 1.8 | $5.1 \times 10^{-9}$ | $4.9 \times 10^{-9}$ | −42° C. | −55° C. |

CONCLUSIONS

The main conclusion is that non-toxic dicyanamide-containing RTILs act as initiators for cyanate ester resin systems by a unique mechanism involving the dicyanamide anion to create a high-$T_g$ resin with low-temperature curing parameters. This initiation involves a direct reaction with the dicyanamide anion, creating an anionic thermoset structure with an ionically associated cation. Cation structure influenced the degree of initiation, especially in the case of a hydroxyl-containing cation. Increased RTIL content shows a plasticization effect due to the decrease in cross-linking density. $T_g$ of the resin also showed great sensitivity to thermal cure schedule design; in at least one case (2% RTIL, $T_g$=270° C.), the plasticization effect was minimal at an RTIL loading that offered effective cure acceleration allowing for optimization of the cure conditions.

The resulting matrix showed lower equilibrium water uptake (1.5% vs 1.8%), and similar hydrolytic degradation and $T_g$ reduction rates after exposure to a humid environment, when compared with a metal/hydroxyl-catalyzed cyanate ester.

The foregoing examples have been presented for the purpose of illustration and description only and are not to be construed as limiting the invention in any way. The scope of the invention is to be determined from the claims appended hereto.

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

All documents mentioned herein are hereby incorporated by reference in their entirety or alternatively to provide the disclosure for which they were specifically relied upon.

The foregoing embodiments are susceptible to considerable variation in practice. Accordingly, the embodiments are not intended to be limited to the specific exemplifications set forth herein. Rather, the foregoing embodiments are within the spirit and scope of the appended claims, including the equivalents thereof available as a matter of law.

The applicant(s) do not intend to dedicate any disclosed embodiments to the public, and to the extent any disclosed modifications or alterations may not literally fall within the scope of the claims, they are considered to be part hereof under the doctrine of equivalents.

The invention claimed is:

1. A curable composition for preparing a thermoset polymer having a triazine network, said curable composition comprising:
   (a) a cyanate ester monomer; and
   (b) at least one ionic liquid comprising a dicyanamide anion.

2. The curable composition of claim 1, wherein said ionic liquid comprises the dicyanamide anion and at least one cation selected from the group consisting of imidazolium, phosphonium, pyridinium and pyrrolidinium.

3. The curable composition of claim 1, wherein said cation is selected from the group consisting of 1-ethyl-3-methyl imidazolium, 1-(3-cyanopropyl)-3-methyl imidazolium, trihexyltetradecylphosphonium, 1-(2-hydroxyethyl)-3-methylimidazolium, 1-butyl-3-methyl pyridinium, and 1-butyl-1-methyl-pyrrolidinium.

4. The curable composition as claimed in claim 1, wherein said cyanate ester monomer has two cyanate ester groups bonded to a core which is an optionally substituted aryl, alkyl or aralkyl group.

5. The curable composition as claimed in claim 1, wherein said cyanate ester monomer has two cyanate ester groups bonded to a core which is an optionally substituted aralkyl group having 2 or more phenyl rings.

6. The curable composition of claim 1, wherein said cyanate ester monomer has two cyanate ester groups bonded to phenyl rings of an alkylenebisphenyl group.

7. The curable composition of claim 6, wherein the alkylene group of said alkylenebisphenyl group is an isopropylene or ethylidene.

8. The curable composition of claim 6, wherein the two cyanate ester groups are bonded at para positions of the phenyl rings.

9. The curable composition of claim 1, wherein a hydroxyl donor is present in the curable composition and is at least one selected from the group consisting of water, an optionally substituted aryl, alkyl or aralkyl group having a hydroxyl, or phenol.

10. The curable composition of claim 1, wherein metals which can catalyze trimerization of cyanate ester monomer under curing conditions are not added to the curable composition.

11. A method of preparing a thermoset polymer having a triazine network comprising combining, in any order, the following:
   (a) a cyanate ester monomer; and
   (b) at least one ionic liquid comprising a dicyanamide anion, to form a mixture, and heating the mixture to a temperature sufficient to cause a curing reaction to thereby form the thermoset polymer having a triazine network.

12. The method according to claim 11, wherein the cyanate ester monomer to dicyanamide ratio of 2:1 to 400:1.

13. The method according to claim 11, wherein the temperature of the curing reaction is 80 to 350C.

14. The method according to claim 11, wherein said ionic liquid comprises the dicyanamide anion and at least one cation selected from the group consisting of imidazolium, phosphonium, pyridinium and pyrrolidinium.

15. The method according to claim 11, wherein said cyanate ester monomer has two cyanate ester groups bonded to a core which is an optionally substituted aryl, alkyl or aralkyl group.

16. The method according to claim 11, wherein a hydroxyl donor is present in the mixture and is at least one selected from the group consisting of water, an optionally substituted aryl, alkyl or aralkyl group having a hydroxyl, or phenol.

17. The method according to claim 11, wherein the majority of triazine rings formed during the curing reaction have a residue of the dicyanamide anion making up part of the triazine ring structure.

\* \* \* \* \*